April 1, 1969        J. GIANNELIA        3,435,576
INTERLOCKING BUILDING BLOCK
Filed July 22, 1966
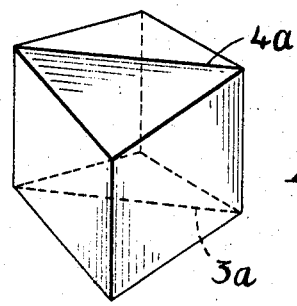
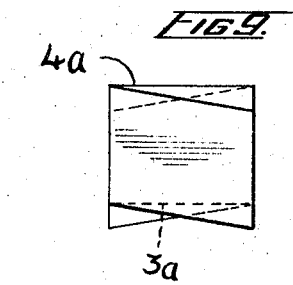
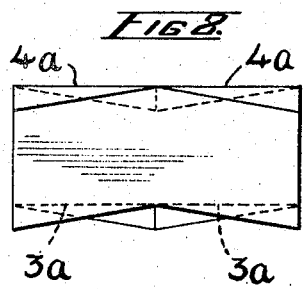
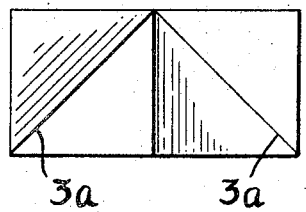
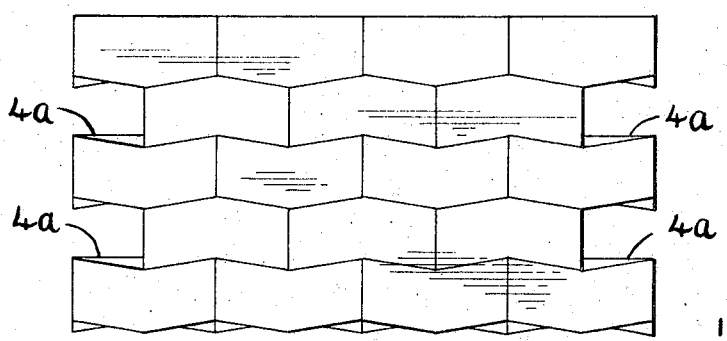
INVENTOR
JOHN GIANNELIA
BY
ATTORNEY United States Patent Office 3,435,576
Patented Apr. 1, 1969

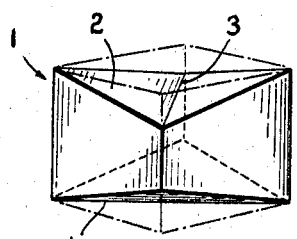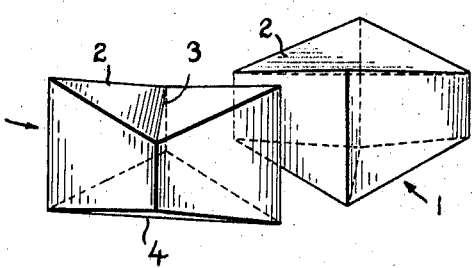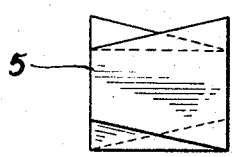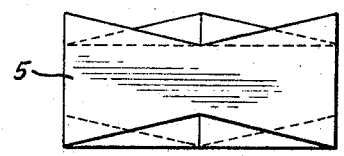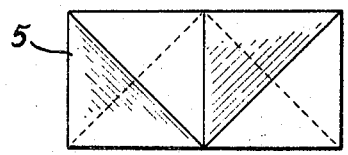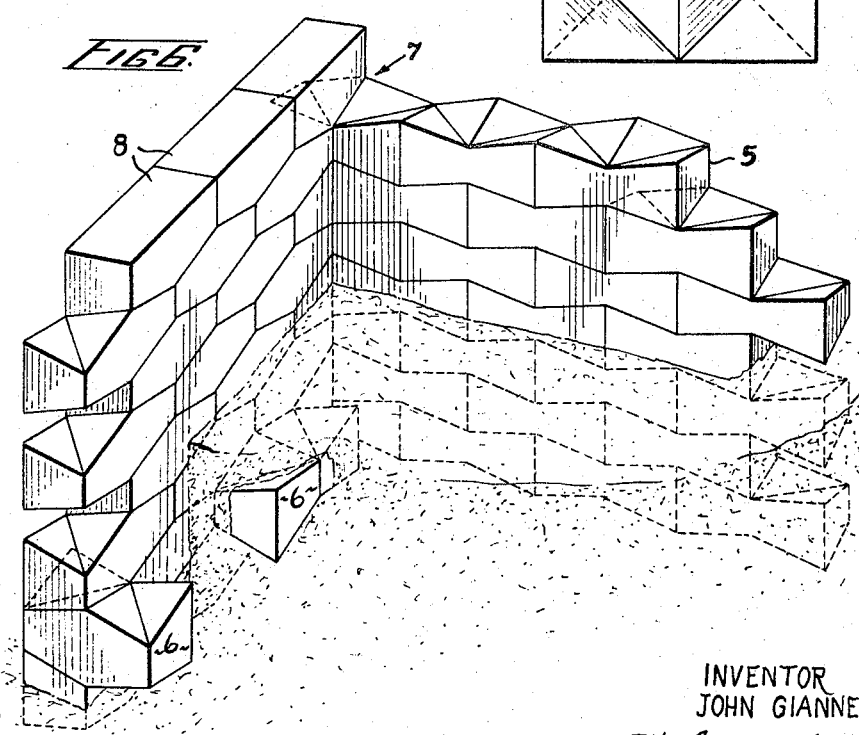

3,435,576
INTERLOCKING BUILDING BLOCK
John Giannelia, 1390 Lakeshore Road W.,
Port Credit, Ontario, Canada
Filed July 22, 1966, Ser. No. 572,636
Claims priority, application Canada, Nov. 19, 1965,
945,731
Int. Cl. E04c 1/10
U.S. Cl. 52—300   6 Claims This invention relates to a novel interlocking constructional element useful in the assembly of walls and other like structures where stability and resistance to shearing forces are required even in the absence of binding materials such as mortar. The constructional element resides in a solid geometric form which finds a basic application as a building block. However, as will be apparent to anyone skilled in the art, this geometric form may be used in a wide variety of embodiments, some of which are more fully described hereinafter.

In order to describe the present invention, an exemplification is set forth with particular reference to solid building blocks of the type used in dry wall construction. This type of wall is widely used for outdoor applications and is familiar in retaining walls, breakwaters, docks, sewage lagoon walls, cooling pond walls in the chemical industry, and the like. These walls are built without mortar for various reasons including economy and ease of construstion, better drainage, and preferred appearance in landscaping applications.

The building of these structures has heretofore required great care and skill since conventional cut stones and bricks, in assembled condition, provide limited resistance to applied shearing forces due to their planar contacting surfaces. Accordingly, if the wall is slightly misaligned, or if the fill behind it shifts, or if water accumulates behind the wall and freezes, then the wall may bulge, tilt or fall. These difficulties have necessitated considerable extra care and expense in erecting structures by prior art methods and materials. Carefully prepared, and in some cases, very elaborate concrete or gravel bed foundations have been necessitated. Great care has been required in tamping and compacting the fill behind these walls. These walls are customarily built with a rearward inclination at a critical angle, and if they lean too far, the base will tend to slide out. Elaborate drainage precautions are essential with such structures using gravel drainage ways and weeping tile.

It is an object of this invention to substantially overcome or at least minimize the current problems by providing a structural element for use in the building of these structures that will result in a much stronger integrated assemblage particularly possessing high shear strength both across and along the course. It is a further object of this invention to provide a structural element suitable for the assembly of relatively massive structures were dimensional stability and high strength are required and where binding materials such as mortar cannot be used. The utility of the present invention can be extended into such fields as the construction of graphite reactor cores and concrete or lead shielding walls for use in nuclear reactors. In this case, as will be obvious, passageways for the insertion of fuel elements and control records may be provided at symmetric points in each structural element, as desired.

It is an object of the present invention to provide a constructional element of general right rectangular prismatic form having shaped faces suitable to interlock with the faces of other similar blocks. It is a further object of the present invention to facilitate the assembly of structures by arranging a plurality of such blocks in layers or in courses, which structures are fully interlocked in all directions in the plane of the said faces.

It is a further object of the present invention to provide, in one embodiment, a building block of generally rectangular parallel piped form having its top and bottom face each shaped in a number of V-ridges and V-notches running at 45 degrees to the axes of the block and being adapted to fully interlock with other similar blocks in a wall structure. These blocks also facilitate construction of right angle turns in a wall, without breaking the block, and, while still maintaining the fully interlocking structure. Further, at intervals, blocks may be inserted at right angles to and laterally of the run of the wall sticking into the fill behind the wall to anchor same. When the fill is compacted about these anchors, the interlocking features result in an extremely effective tie between the wall and the fill behind it.

The form of these blocks can be described in terms of multiples of two types of simple modular units. The first type consists of a module having a substantially square cross-section between end faces, one end face being formed with a diagonally extending V-ridge and the opposite end face being formed with a diagonally extending V-notch at right angles to the V-ridge. Each side of the modular unit is formed as an identical truncated isosceles triangle with each base thereof together with the corresponding base of an adjacent side, forming a square corner; the ends of each corner terminating at the peak of either a V-ridge end face or a V-notch end face; the edge of each side opposite the aforementioned base, together with the corresponding edge of an adjacent side, forming a square corner with the ends of each corner terminating at the base of either a V-ridge end face or a V-notch end face.

The second type of modular unit consists of a module having end faces similar to the first modular unit but with the V-ridge and V-groove running parallel. Each side of the unit is formed as an identical parallelogram; the opposite parallel edges of each side, in cooperation with corresponding edges of the other sides, forming square corners of the modular unit with the ends of the corners terminating at the end faces.

Two or more modular units of either the first or second type can be combined by abutting identical truncated isosceles triangle faces or identical parallelogram faces as the case may be and with identical end faces up to form the constructional elements and forms of this invention. Naturally, it will be appreciated that many variations may be effected without departing from the spirit and scope of the present inventive concept. Thus base courses and coping stones can be provided by making one of the end faces flat and further for architectural effect changeover courses can be provided by making both end faces the same, either V-ridged or V-notched.

The invention will be further described by reference to the accompanying drawings wherein:

FIG. 1 is a perspective view of the first type of a modular "unit" according to the present invention;

FIG. 2 is a perspective view of the first type of a complete constructional element exploded to show the two modular "units" of which the element consists;

FIG. 3 is an end view of an element of the first type;

FIG. 4 is a side elevation of an element of the first type;

FIG. 5 is a plan view of an element of the first type;

FIG. 6 is a perspective partial view of the first type of an assembled wall using constructional elements according to the present invention.

FIG. 7 is a perspective view illustrating the second type of modular unit;

FIG. 8 is a side elevation of a complete constructional element composed of two corresponding modular units;

FIG. 9 is an end view of the constructional element of FIG. 8;

FIG. 10 is a plan view looking at the underside of the constructional element of FIG. 8; and FIG. 11 is an elevation of an assembled wall using the second type of modular unit.

With particular reference to FIG. 1 of the drawings, a modular "unit" is illustrated, such modular unit forming half of a complete element or brick. It will be appreciated that, in constructing a wall or like structure, a certain number of units 1 will be required for finishing purposes since the bricks, as in conventional manner are primarily intended to overlap each other.

As indicated by the dotted lines in FIG. 1, the modular unit 1 may be said to be fashioned from a right rectangular prism of substantially square cross-section, one surface, designated by the numeral 2, being shaped in a V-notch running along a diagonal line 3; the opposed surface 4 being shaped in the form of a V-ridge; the crest of the ridge running along a diagonal disposed at right angles to the opposed diagonal line 3.

FIGS. 7, 8, 9, 10 and 11 illustrate the second type mentioned in Column 2 commencing at Line 42. That type is basically the same as the first type previously described. The difference resides in the fact that the second type has the V-groove indicated by the numeral 3a and the V-ridge indicated by numeral 4a, both of which are diagonals running in the same direction. Consequently, all faces of the V-ridge and the V-notch are parallel to each other. The V-ridge and the V-notch are mirror images. Therefore a series of units may be brought together with V-ridge of one unit fitting into the V-notch of another unit.

It will be noticed that formation of the opposed notches and ridges results in vertical sides in the form of isosceles trapezoids arranged in alternately reversing orientation with respect to each other.

As represented in FIG. 2, a complete constructional element 5 is obtained by interconnecting two modular units, like faces up, and matching isosceles trapezoid faces in abutment.

The complete element, would, of course, be manufactured as an integral unit by any of the known methods using any known and suitable materials.

In this way, a constructional element is provided with contacting surfaces operable, when assembled with like elements, to provide a structure which is highly resistant to shearing forces from any lateral direction, even in the absence of bonding materials.

FIGS. 3, 4 and 5 particularly indicate the combination of contacting surfaces which provide the stability and resistance to shear that is desired.

Turning to FIG. 6, a partial retaining wall structure is illustrated to demonstrate the utility of the subject invention.

Numeral 6 indicates an element inserted at right angles to the course such that half the element protrudes into the earth or fill, acting as an anchor or keying means. It will be obvious to those skilled in the art that such anchoring means, coupled with the resistive characteristics inherent in this novel construction, provides a far superior assembly than has heretofore been available.

A further advantageous characteristic of the present invention is revealed at the location generally indicated at 7. One of the most annoying aspects in building walls with prior types of interlocking bricks, etc., has been the turning of right angled corners. With the present invention, this aspect is no longer troublesome since the novel bricks interlock at right angles in just the same manner as in building a straight course.

Still another advantage of the present invention resides in the fact that, when stripping the pieces from the mould, they can be slid out of the mould.

Although it is quite obvious that such are necessary, a finishing or capping brick is illustrated at 8. The capping bricks 8 are planar on the upper surface and are suitably ridged or notched on the under surface. Bricks 8 may also be utilized to simplify laying of the bottom layer in the wall structure.

Many possible modifications will become apparent from the foregoing without departing from the spirit of the present invention. For example, each brick surface could be formed in various combinations of ridges and notches instead of the illustrated pair of notches and pair of ridges. However, the foregoing disclosure is presented in an illustrative sense rather than a limiting sense and the appended claims are relied upon to define the scope of the present invention.

What I claim as new and desire to protect by Letters Patent of the United States is:

1. A construction element comprising at least two identical modular units, each modular unit having a substantially square cross-section in plan bounded by four rectilinear flat sides, an upper wall and a lower wall; one of said walls being of gable-like formation sloping downwardly from a diagonally extending V-ridge and the other wall being formed as a diagonally extending valley open at both ends and which is the mirror image of the gable-like wall, the gable-like wall and the valley extending substantially at right angles to one another, abutting units having their respective ridges oriented at 90° to each other to thereby form a continuous zig-zag ridge line.

2. A construction element consisting of a plurality of modular units, each of said modular units characterized in that it has:
   (1) a square cross-section,
   (2) four isosceles trapezoid side faces perpendicular to said cross section arranged in alternately reversing orientation about said cross-section and having their parallel edges perpendicular to said cross-section,
   (3) one end face consisting of two identical triangular planes of equal inclination to the said cross-section arranged so that the said planes intersect in a line parallel to the said cross-section and in the plane of the perpendicular projection of one diagonal of the said cross-section, thereby forming a V-notch, and
   (4) another end face consisting of two identical triangular planes of equal inclination to the said cross-section arranged so that the said planes intersect in a line parallel to the said cross-section and in the plane of the perpendicular projection of the other diagonal of the said cross-section, thereby forming a V-ridge;
said modular units being combined in pluralities in the plane of said cross-section to have identical isosceles trapezoid faces abutting.

3. A construction element as defined in claim 2 comprising in shape the combination of two of said modular units oriented so that they both have their V-ridged surfaces facing in the same direction.

4. The constructional element according to claim 3 further characterized in that said element is formed from a solid material selected from the group consisting of brick clay, concrete, artificial stone and the like.

5. Construction element according to claim 3 in which either the V-ridged surface or the V-notched surface is replaced by a planar or other suitably shaped surface to form a base course or capping element.

6. A construction element comprising at least two identical modular units, each modular unit having a substantially square cross-section in plan bounded by four rectilinear flat sides, an upper wall and a lower wall; one of said walls being of gable-like formation sloping downwardly from a diagonally extending V-ridge and the other wall being formed as a diagonally extending valley open at both ends and which is the mirror image of the gable-like wall, said gable-like wall and the valley extending in the same direction, abutting units having their respective ridges oriented at 90° to each other to thereby form a continuous zig-gag ridge line.

References Cited

UNITED STATES PATENTS

| | | | |
|---|---|---|---|
| 789,820 | 5/1905 | Specht | 52—590 |
| 903,907 | 11/1908 | Soss | 52—594 |
| 1,689,107 | 10/1928 | Bradley | 52—594 |
| 3,229,439 | 1/1966 | Strobel | 52—594 X |

FOREIGN PATENTS 325,514   3/1935   Italy.

ALFRED C. PERHAM, *Primary Examiner.*

U.S. Cl. X.R.

52—590, 594, 575